(12) United States Patent
Tonooka et al.

(10) Patent No.: US 9,966,095 B2
(45) Date of Patent: May 8, 2018

(54) PERPENDICULAR MAGNETIC RECORDING MEDIA HAVING AN EXTREMELY LOW HK LAYER

(71) Applicant: HGST Netherlands B.V., Amsterdam (NL)

(72) Inventors: Shun Tonooka, Kobe (JP); Masayoshi Shimizu, Chigasaki (JP); Maki Maeda, Hiratsuka (JP); Kiwamu Tanahashi, Kokubunji (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days. days.

(21) Appl. No.: 15/226,830

(22) Filed: Aug. 2, 2016

(65) Prior Publication Data
US 2018/0040345 A1    Feb. 8, 2018

(51) Int. Cl.
*G11B 5/66* (2006.01)
*G11B 5/39* (2006.01)

(52) U.S. Cl.
CPC .............. *G11B 5/66* (2013.01); *G11B 5/3912* (2013.01)

(58) Field of Classification Search
None
See application file for complete search history.

(56) References Cited

U.S. PATENT DOCUMENTS

| | | | | |
|---|---|---|---|---|
| 7,488,545 B2 * | 2/2009 | Fullerton | .................. | G11B 5/65 428/828.1 |
| 7,736,765 B2 | 6/2010 | Vu et al. | | |
| 8,298,688 B2 | 10/2012 | Nemoto et al. | | |
| 8,460,805 B1 * | 6/2013 | Gao | .................. | G11B 5/66 428/692.1 |
| 8,658,292 B1 | 2/2014 | Mallary et al. | | |
| 8,940,418 B1 * | 1/2015 | van Ek | .................. | G11B 5/66 428/828.1 |
| 9,042,053 B1 | 5/2015 | Yang et al. | | |
| 2007/0072011 A1 * | 3/2007 | Li | .................. | B82Y 10/00 428/828.1 |
| 2010/0247960 A1 * | 9/2010 | Qiu | .................. | G11B 5/855 428/800 |
| 2011/0122525 A1 * | 5/2011 | Nemoto | .................. | G11B 5/65 360/75 |

(Continued)

OTHER PUBLICATIONS

Judy, J., "Advancements in PMR thin-film media," Journal of Magnetism and Magnetic Materials, vol. 287, 2005, pp. 16-26.

*Primary Examiner* — Kevin M Bernatz
(74) *Attorney, Agent, or Firm* — Foley & Lardner LLP

(57) ABSTRACT

A magnetic media for magnetic data recording having reduced signal noise. The magnetic media includes a magnetic recording layer that has first, second and third portions. The first portion at the bottom of the magnetic recording layer includes an oxide and has a high anisotropy field. The third portion, located at the top of the magnetic recording layer has a low anisotropy field and does not include an oxide. The second portion, located between the first and third portions has an anisotropy field that is between that of the first and third magnetic portions. The second portion includes a thin layer of a material that has an extremely low anisotropy field that is located within a material having a higher magnetic anisotropy.

20 Claims, 11 Drawing Sheets

(56) References Cited

U.S. PATENT DOCUMENTS

| | | | |
|---|---|---|---|
| 2012/0026626 A1* | 2/2012 | Nolan | G11B 5/66 360/135 |
| 2012/0251846 A1* | 10/2012 | Desai | G11B 5/65 428/828.1 |
| 2012/0307395 A1 | 12/2012 | Tonooka et al. | |
| 2013/0163118 A1 | 6/2013 | Bian et al. | |
| 2014/0104724 A1* | 4/2014 | Shiroishi | G11B 5/66 360/75 |
| 2015/0085401 A1* | 3/2015 | Nemoto | G11B 5/82 360/135 |
| 2015/0179202 A1* | 6/2015 | Kim | G11B 5/66 428/828.1 |

\* cited by examiner

PERPENDICULAR MAGNETIC RECORDING MEDIA HAVING AN EXTREMELY LOW HK LAYER

FIELD OF THE INVENTION

The present invention relates to magnetic data recording, and more particularly to a perpendicular magnetic media having a magnetic recording layer with a layer having a very low anisotropy field (Hk) interspersed therein for reduced signal noise.

BACKGROUND

At the heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When current flows through the coil, a resulting magnetic field causes a magnetic flux to flow through the coil, which results in a magnetic write field emitting from the tip of the write pole. This magnetic field is sufficiently strong that it locally magnetizes a portion of the adjacent magnetic media, thereby recording a bit of data. The write field then, travels through a magnetically soft under-layer of the magnetic medium to return to the return pole of the write head.

A magnetoresistive sensor such as a Giant Magnetoresistive (GMR) sensor, a Tunnel Junction Magnetoresistive (TMR) sensor or a scissor type magnetoresistive sensor can be employed to read a magnetic signal from the magnetic media. The magnetoresistive sensor has an electrical resistance that changes in response to an external magnetic field. This change in electrical resistance can be detected by processing circuitry in order to read magnetic data from the magnetic media.

SUMMARY

The present invention provides a magnetic media for magnetic data recording that includes a magnetic recording layer with first, second and third magnetic portions, where the second magnetic portion is located between the first and third magnetic portions. The second magnetic portion includes a first magnetic material and a layer of a second magnetic material having a low anisotropy field located within the first magnetic material. The second magnetic material has an anisotropy field that is at least 10 kOe lower than that of the first magnetic layer.

The presence of the second (low anisotropy field) material layer in the second magnetic portion advantageously reduces signal noise, improves trim robustness, and results in a small cluster size distribution.

The first magnetic portion of the recording layer can be a layer that includes an oxide and has a high anisotropy field. The third portion, located closest to the surface of the magnetic media can be formed as a magnetic layer that has no oxide and that has a low anisotropy field. The second portion can have an anisotropy field that is somewhere between that of the first portion and that of the third portion. The presence of the extremely low anisotropy field material within the second portion reduces anisotropy field so as to more readily promote switching of magnetizations of magnetic grains by a write field from a magnetic write head, while also maintaining stability of the magnetic signal recorded to the magnetic recording layer.

These and other features and advantages of the invention will be apparent upon reading of the following detailed description of the embodiments taken in conjunction with the figures in which like reference numeral indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
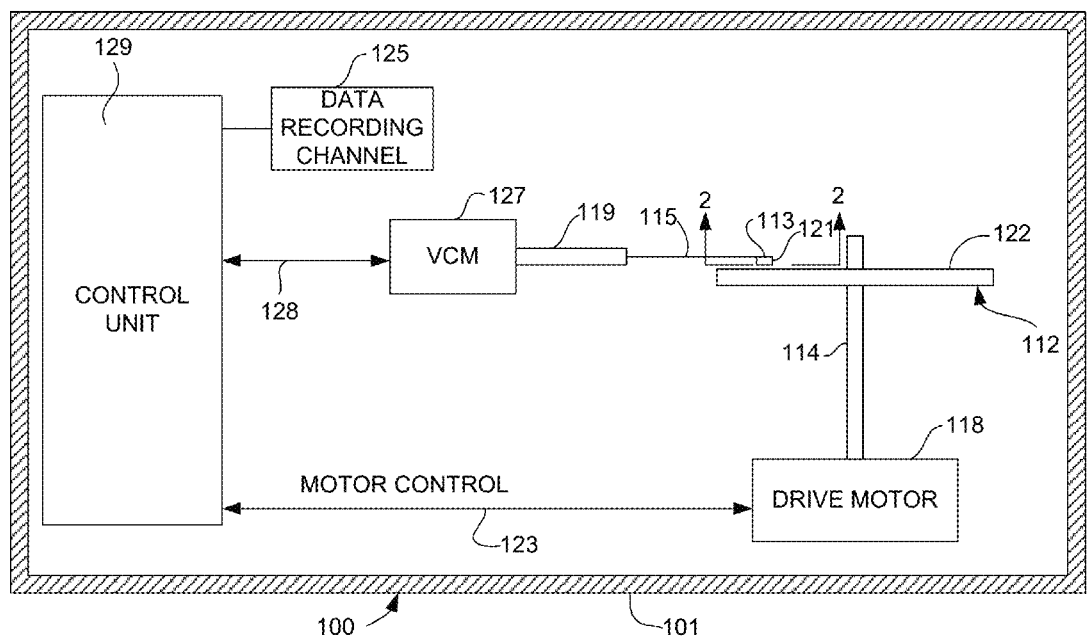
FIG. 1 is a schematic illustration of a disk drive system in which the invention might be embodied.

Referring now to FIG. 1, there is shown a disk drive 100. The disk drive 100 includes a housing 101. At least one rotatable magnetic disk 112 is supported on a spindle 114 and rotated by a disk drive motor 118. The magnetic recording on each disk may be in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by the controller 129.

During operation of the disk storage system, the rotation of the magnetic disk 112 generates an air bearing between the slider 113 and the disk surface 122, which exerts an upward force or lift on the slider. The air bearing thus counter-balances the slight spring force of the suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, and a microprocessor. The control unit 129 generates control signals to control various system operations such as drive motor control signals on line 123 and head position and seek control signals on line 128. The control signals on line 128 provide the desired current profiles to optimally move and position the slider 113 to the desired data track on the media 112. Write and read signals are communicated to and from write and read heads 121 by way of recording channel 125.

Figure 2:
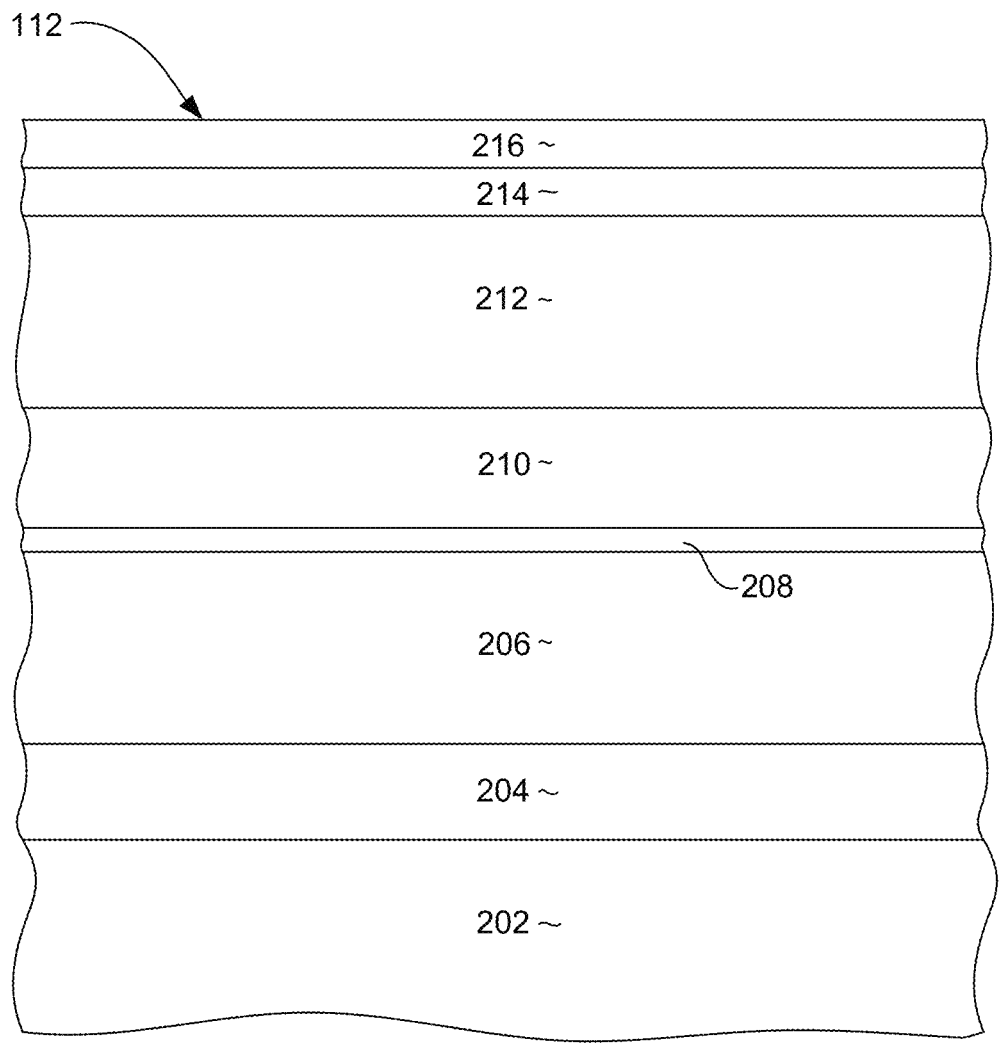
FIG. 2 is a side, cross-sectional view of a portion of a magnetic media.

FIG. 2 shows cross sectional view of a portion of a magnetic media 112, such as might be used in a data recording system described above with reference to FIG. 1. The magnetic media 112 includes a substrate, such as a glass or ceramic substrate material. An adhesion layer 204 can be formed over the substrate to ensure good adhesion of the above media layers to the substrate 202.

A soft magnetic under-layer 206 can be formed over the adhesion layer 204. The soft magnetic layer 206 can be a magnetic material having a low magnetic coercivity and low anisotropy field (Hk). The soft magnetic under-layer 206 provides a return path for the magnetic field from the write head (not shown). A seed layer 208 can be formed over the soft magnetic under-layer 206. The seed layer can be a material such as Ni and helps to initiate a desired crystalline structure in the above applied layers. An intermediate layer 210 can be formed over the seed layer 208. The intermediate layer 210 can be formed of a non-magnetic material and is preferably constructed of Ru.

A magnetic recording layer 212 (which will be described in greater detail herein below) is formed over the intermediate layer 210. The intermediate layer helps to magnetically decouple the magnetic recording layer 212 from the soft magnetic under-layer 206. The magnetic recording layer has a structure such that it can be magnetized in a direction perpendicular to the plane of the layers by a magnetic field from a magnetic write head (not shown), and this magnetization can remain fixed and stable until it is written to again at a later time by a magnetic field from the write head. In order to protect the magnetic recording layer from wear and corrosion, an overcoat layer 214 can be formed over the magnetic recording layer 212. The overcoat 214 can be a physically hard material such as carbon, and a lubricant layer 216 can be formed over the overcoat layer 214.

Figure 3B:
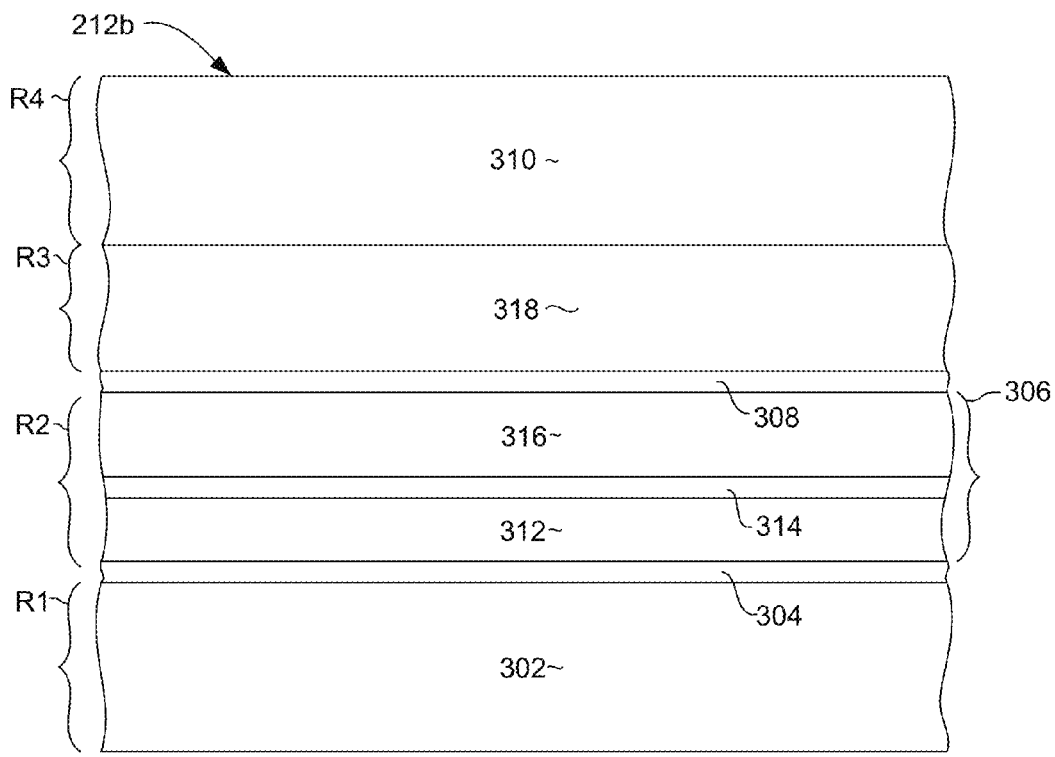
FIG. 3b is an enlarged, side, cross-sectional view of a magnetic recording layer according to an alternate embodiment.
Figure 3A:
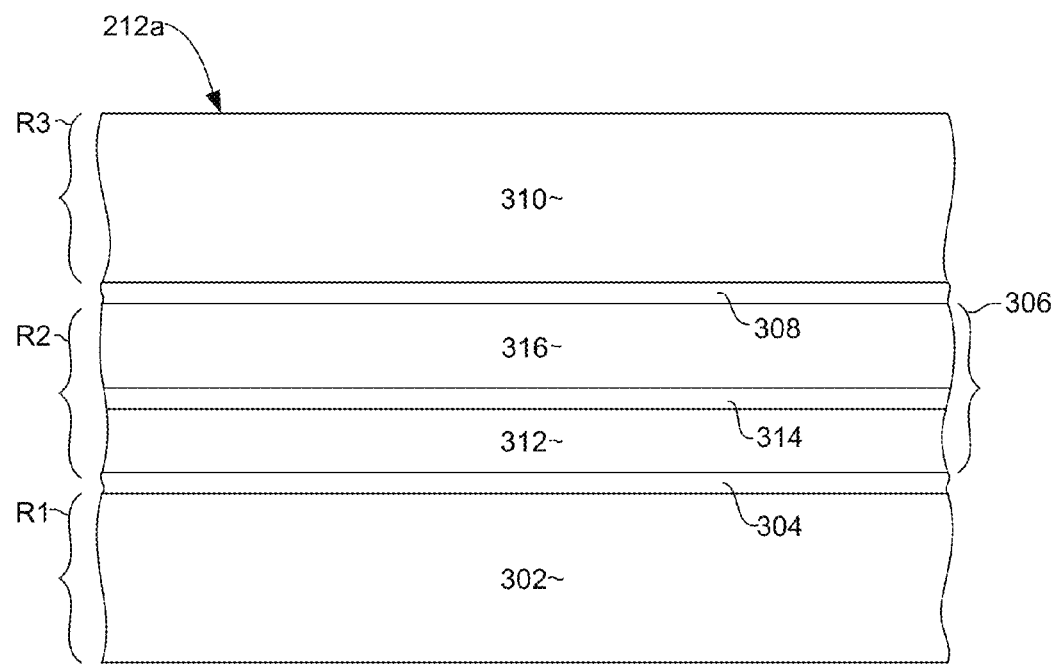
FIG. 3a is an enlarged, side, cross-sectional view of a magnetic recording layer of the magnetic media of FIG. 2.

FIGS. 3a and 3b show enlarged, cross sectional views of the magnetic recording layer 212a (FIG. 3a) and 212b (FIG. 3b) according to two possible embodiments. In order to reliably record magnetic data on the media it is desirable that the magnetic recording layer 212 be constructed such that the magnetization can be efficiently magnetized by a magnetic write field and that these magnetizations remain stable and fixed. It is also desirable that the magnetic transitions be clearly distinct from one another in order to reduce signal noise.

As shown in FIG. 3a, the magnetic recording layer includes first, second and third magnetic portions R1 (302), R2 (306) and R3 (310). The first layer R1 302 is located at the bottom (furthest from the surface of the media and closest to the under-layer 206 (FIG. 2), and the third magnetic portion R3 310 is located closest to the surface of the media and furthest from the under-layer 206 (FIG. 2). The second magnetic portion R2 306 is located between the first and third portions 302, 310. Each of the magnetic portions R1 302, R2 306 and R3 310 are separated from one another by exchange control layers 304, 308, which can be constructed of materials such as Co and Cr.

The first portion R1 302 has a very high anisotropy field energy Hk and is designed to strongly maintain its magnetization once magnetized. The first portion 302 can be formed as individual magnetic grains that are separated from one another by non-magnetic oxide boundary layers. In this sense, the structure of the first magnetic portion 302 can resemble a honeycomb structure with cells oriented vertically (perpendicular to the layers of the media).

The upper, third magnetic portion R3 310 has a much lower anisotropy field Hk. This portion 310 can be formed without oxide layers, having magnetic grains that are not clearly isolated from one another in the way that the grains of the first portion 302 are. The third portion 310, therefore, can readily respond to a magnetic field so as to alter its magnetization in the presence of such a magnetic field.

The middle magnetic portion, second magnetic portion 306, is configured so as to transfer the magnetization of the upper, third portion 310 to the lower, first portion 302. The second magnetic portion 306 overall has an anisotropy field that is between that of the first portion 302 and the third portion 310. However, this middle second portion 306 has a novel structure that greatly improves signal to noise ratio as will be described.

The middle portion (second magnetic portion 306) includes a first magnetic material formed as first and second magnetic layers 312, 316, and a second magnetic material formed as layer 314 located within the first material between layers 312, 316. The layers 312, 316 have an anisotropy field that is between that of the first magnetic portion R1 302, and that of the upper third magnetic portion R3 310. However, the layer 314 has an extremely low anisotropy field (Hk). The layer 314 preferably has an anisotropy field that is less than 5 kOe and that can even be negative. By contrast, the first material (layers 312, 316) can have an anisotropy field of more than 15 kOe. The layer 314 also preferably has a saturation magnetization Ms that is at least 500 emu/cc. The layer 314 preferably has a thickness of 0.2 to 0.6 nm. The layer 314 can be a material that includes Co and at least one of Cr and Ru. The layers 312, 316 and layer 314 can also include Pt, with the concentration of Pt in the layer 314 being less than the concentration of Pt in the layers 312, 316. The concentration of Pt in the layer 314 can be at least 10 atomic percent less than the concentration of Pt in layers 312, 316. Preferably, the layer 314 includes less than 5 atomic percent Pt, and the first magnetic material, layers 312, 316, includes Pt at more than 15 atomic percent. Also, the layer 314 can include a non-magnetic element in a concentration of less than 20 atomic percent. The layer 314 can include at one or more of Ru, W, Fe, Hf, Ta and Nb. The layer 314 can also include Ir.

The first magnetic recording layer portion R1 302 can have an anisotropy field Hk of 20-23 kOe. The upper, third magnetic layer portion R3 310 can have an anisotropy field of 13-16 k Oe The majority of the second magnetic recording layer portion R2 306 (i.e. layers 312, 316 can have an anisotropy field of 16-20 kOe. However as mentioned above, the thin layer 314 (located between layers 312, 316) can have a lower anisotropy field Hk of less than 5 kOe. The layers 312, 316 can be formed as magnetic grains that are isolated from one another by non-magnetic, oxide boundary layers (similar to the first layer R1 302), whereas layer 314 can be formed without such oxide grain boundary isolation.

FIG. 3b shows a magnetic recording layer 212b having a four layer structure including layers: R1 (302), R2 (306), R3 (318) and R4 310. This embodiment 212b is similar to the structure 212a described above with reference to FIG. 3a, except that layer R3 318 is added between layer 310 (which can be a capping layer having no oxide), and layer R2 (306). In this case R3 318 is a granular magnetic layer that includes an oxide. Layer R3 318 has a high anisotropy field Hk. Layer R3 318 has an anisotropy field Hk value that is higher than that of the underlying second layer R2 306, and preferably also includes Pt at a concentration that is higher than that of the R2 layer 306.

Figure 4:
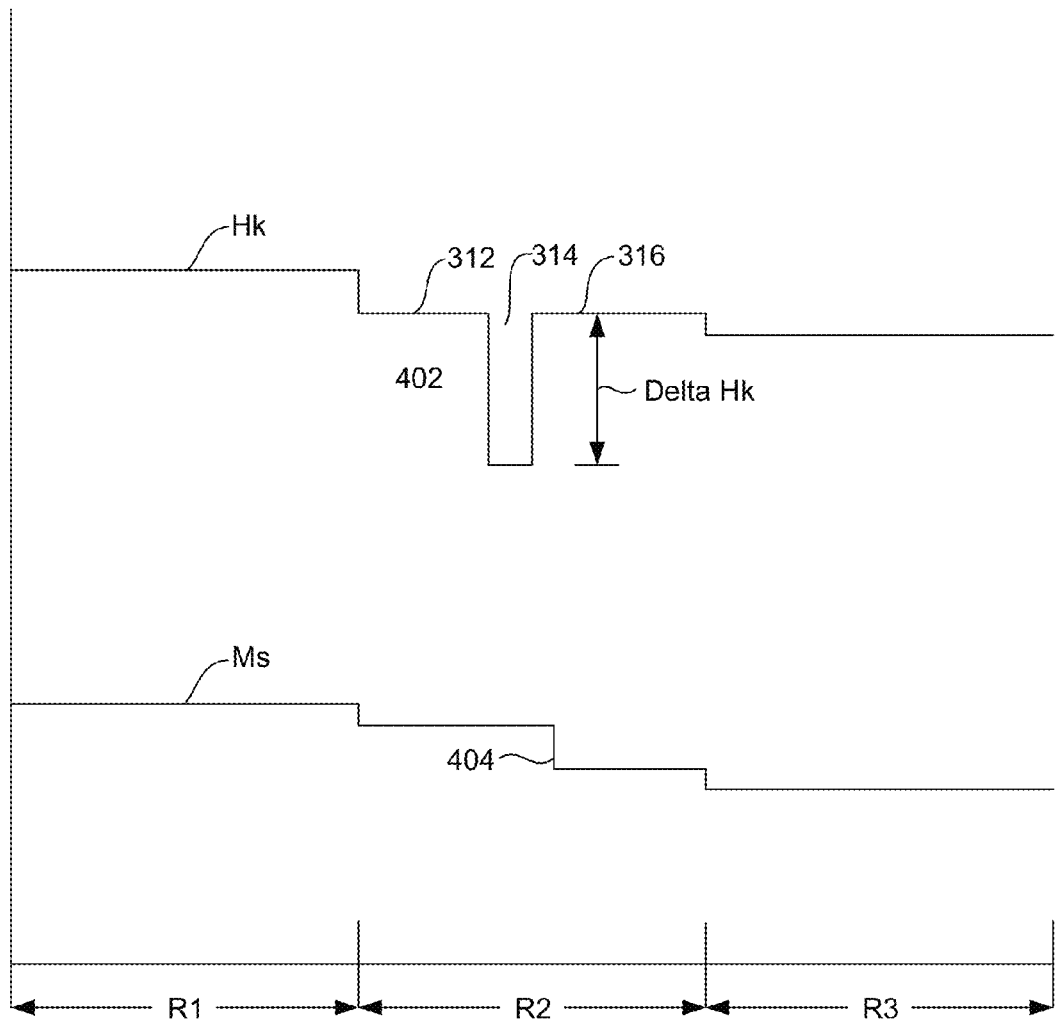
FIG. 4 is a graph showing anisotropy field and saturation magnetization at various locations within a magnetic recording layer.

The relative magnetic anisotropies and saturation magnetizations of the magnetic portions R1 302, R2 306 and R3 (310 in FIG. 3a) (318 in FIG. 3b) can be understood more clearly with reference to FIG. 4, which shows a graph of magnetic anisotropy field Hk and saturation magnetization Ms throughout the magnetic portions R1, R2, R3 302, 306, 310/318. In FIG. 4, the location within the magnetic recording layer 212 is indicated on the horizontal axis, and the amount magnetic anisotropy field Hk and saturation magnetizations Ms of these layers is shown relative to the vertical axis.

As can be seen in FIG. 4, the portion R1 302 has the highest magnetic anisotropy field Hk and highest saturation magnetization Ms of all of the portions R1, R2, R3. Both the magnetic anisotropy field Hk and saturation magnetization Ms drop slightly for portion R2, and drop further for portion R3, so that portion R3 has the lowest overall anisotropy field Hk and lowest overall saturation magnetization Ms. However, as can be seen, portion R2 has a deep Hk trough or valley, which corresponds with the location of low Hk layer 314 of FIG. 3. The drop in Hk between the other layers 312, 316 of portion R2 and the location of the layer 314 represents an Hk delta that is preferably at least 10 kOe.

It can also be seen that the presence of the low anisotropy field Hk valley 402 also results in a drop in saturation magnetization between the portions 312 and 316, as indicated by point 404 in the graph of FIG. 4. This affect, produced by the presence of the very low Hk layer 314 (FIG. 3) results in a significant reduction in signal noise and improvement in magnetic recording performance. Mechanisms by which this is achieved are described herein below.

Figure 5A:
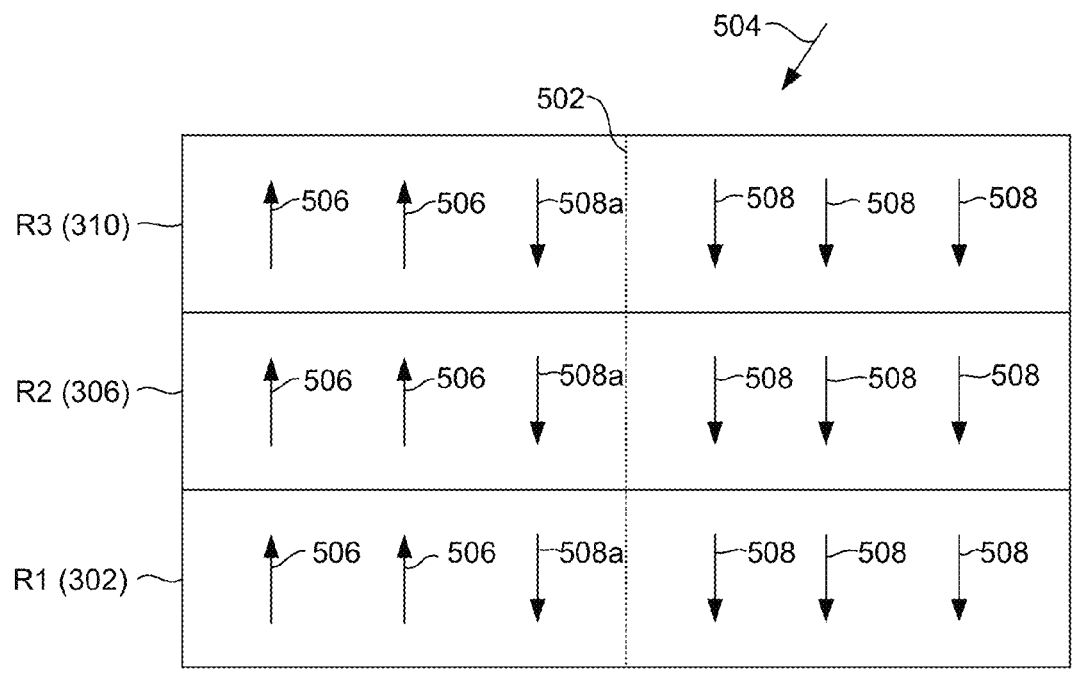
FIGS. 5a and 5b are schematic illustrations of magnetic response in a magnetic recording layer that does not incorporate an extremely low Hk layer.
Figure 5B:
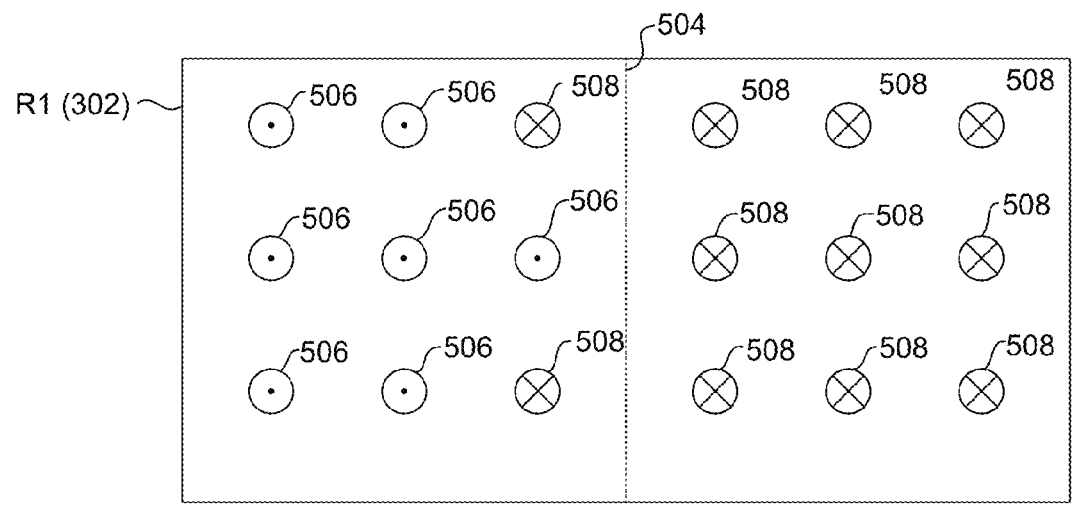
Figure 6A:
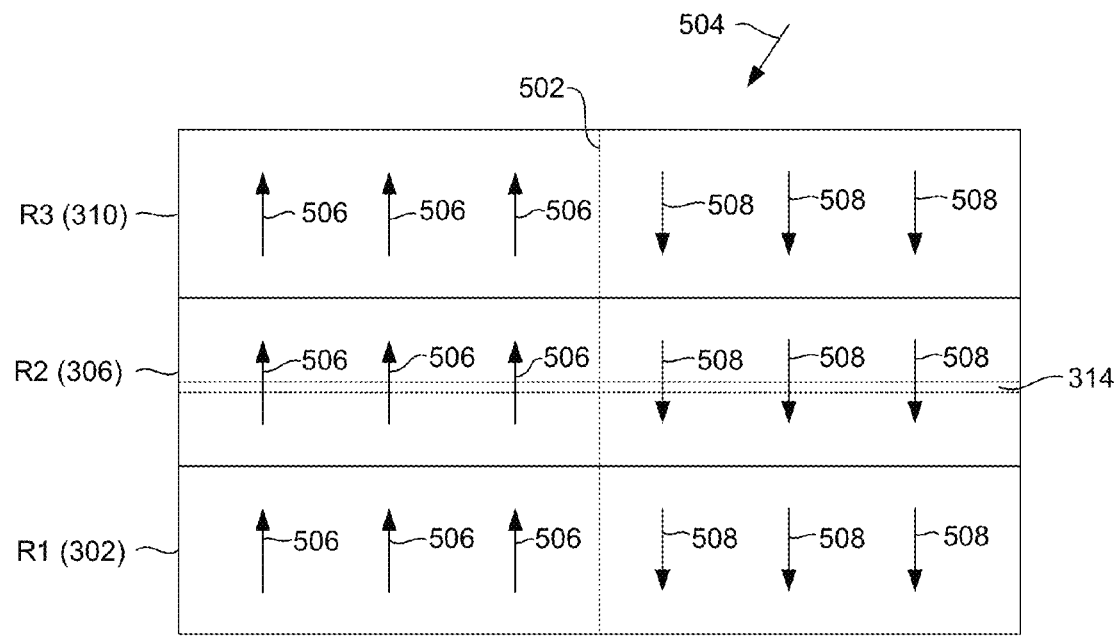
FIGS. 6a and 6b are schematic illustrations of magnetic response in a magnetic recording layer that does incorporate an extremely low Hk layer.
Figure 6B:
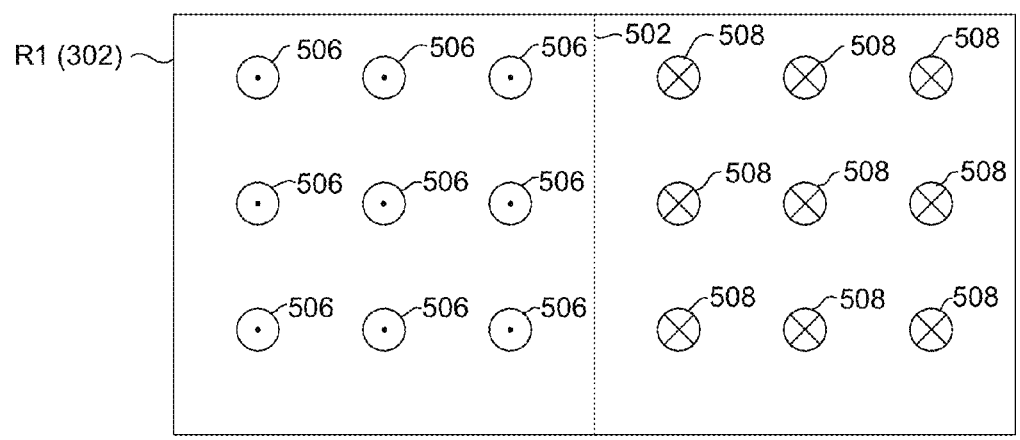

FIG. 5a shows a side cross sectional view of portions R1 (302), R2 (306) and R3 (310), for a structure not incorporating the extremely low Hk layer 314 (FIG. 3), and FIG. 5b shows a top down view of portion R1 (302) for such a structure that does not incorporate the extremely low Hk layer 314. Similarly, FIG. 6a shows a side, cross sectional view of portions R1 (302), R2 (306) and R3 (310) for a structure that does incorporate the novel extremely low Hk layer 314 into the R2 portion 306, and FIG. 6b shows a top down view of portion R1 (302) for such a structure.

In a magnetic recording media, the portion R3 is a write assist portion (also can function as a cap) that is intended to respond easily to a magnetic field. Magnetic torque from R3 (310) is imparted to portion R1 (302) by the middle portion R2 (306). Portion R1 302 is designed to have a high anisotropy field so as to be thermally, magnetically stable.

With reference to FIGS. 5a and 5b, dashed line 502 indicates a transition location between two different magnetic states on a recording layer 212. As the media passes by a write head (not shown) a magnetic write field 504 causes the direction of magnetization to switch from one direction to an opposite direction. Arrows 506 indicate up oriented magnetization and arrow symbols 508 indicate downward oriented magnetic orientations of the media portions R3 (310) R2 (306) and R1 (302).

An exchange field from the R1 layer 302 causes the magnetization to rotate to upward at the left of the transition 502 to downward at the right of transition 502, as desired. However, an anisotropy field from the R2 layer 306 act in an opposite direction which can cause some of the grains to be magnetized opposite to the desired direction (e.g. oriented downward as shown by arrow 508a). This undesirably results in high signal noise, poor trim robustness and large cluster size distribution, because these grains are not magnetized in the correct direction.

However, in the structure of FIGS. 6a and 6b, the presence of the extremely low Hk layer 314 lowers the anisotropy field of the R2 portion 306. Therefore, the desired exchange field which rotates the magnetic orientation as desired, is not counteracted by an anisotropy field from the R2 portion 306. As a result, all of the grains at the left of the transition point 502 are oriented in the desired direction (e.g. upward in FIGS. 6a and 6b. This advantageously results in greatly reduced signal noise, improved trim robustness and small cluster size distribution.

Figure 7:
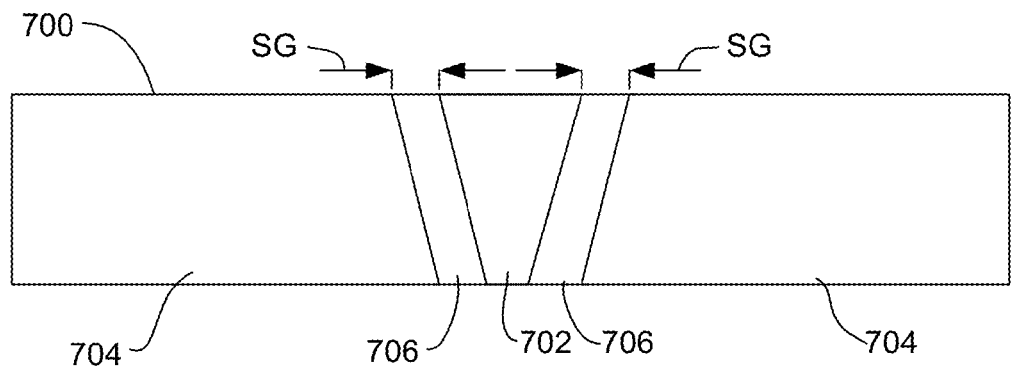
FIG. 7 is a view of a portion of a magnetic write head as viewed from the media facing surface.

FIG. 7 shows a view of a portion of a magnetic write head 700, as viewed from the media facing surface, that could be used in a magnetic data recording system incorporating the magnetic media such as that described above with reference to FIGS. 2, 3, 4 and 6. The magnetic write head 700 includes a magnetic write pole 702, magnetic side shields 704, and non-magnetic gap layers 706 located between the magnetic write pole 702 and each of the side shields 704. The non-magnetic gap layer 706 has a gap thickness or gap spacing SG that is preferably at least 60 nm. This is because, the magnetic medium described above provides optimal performance when used with a write head having a relatively larger side gap, such as 60 nm or greater. On the other hand, when the Extremely Low Hk Layer (ELHL) is in the magnetic layer R3 instead of R2 in FIG. 3b, a narrower side gap such as 60 nm or smaller is preferable.

Figure 8:
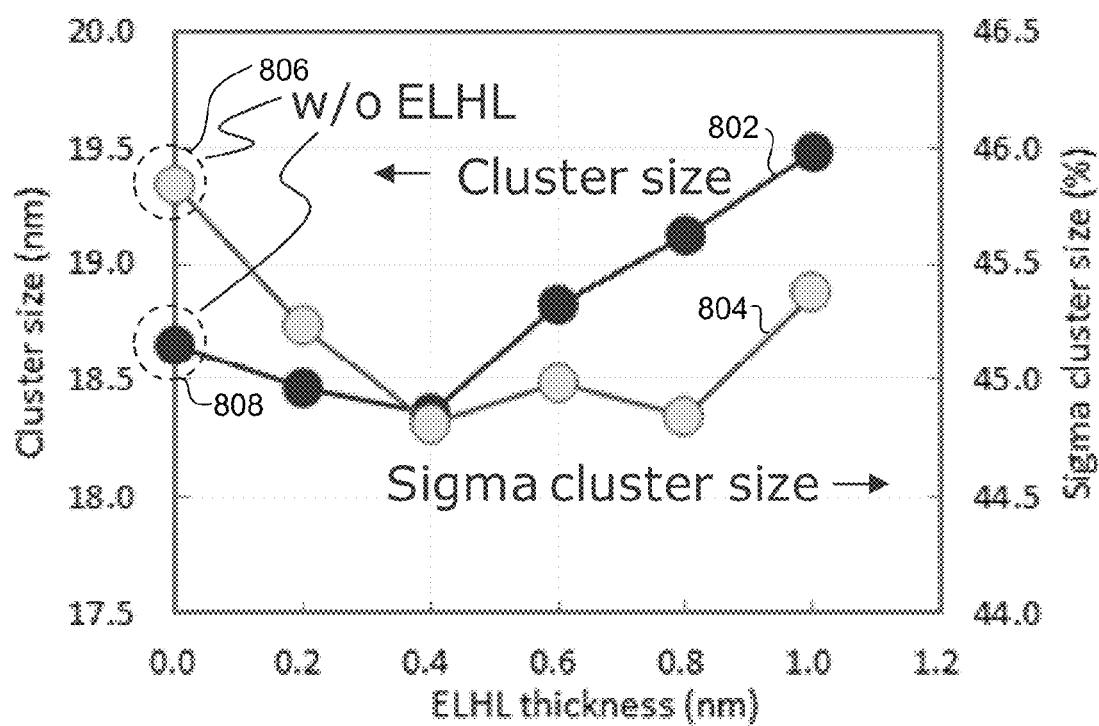
FIG. 8 is a graph showing cluster size and cluster size distribution as a function of thickness of an extremely low Hk material layer.
Figure 9:
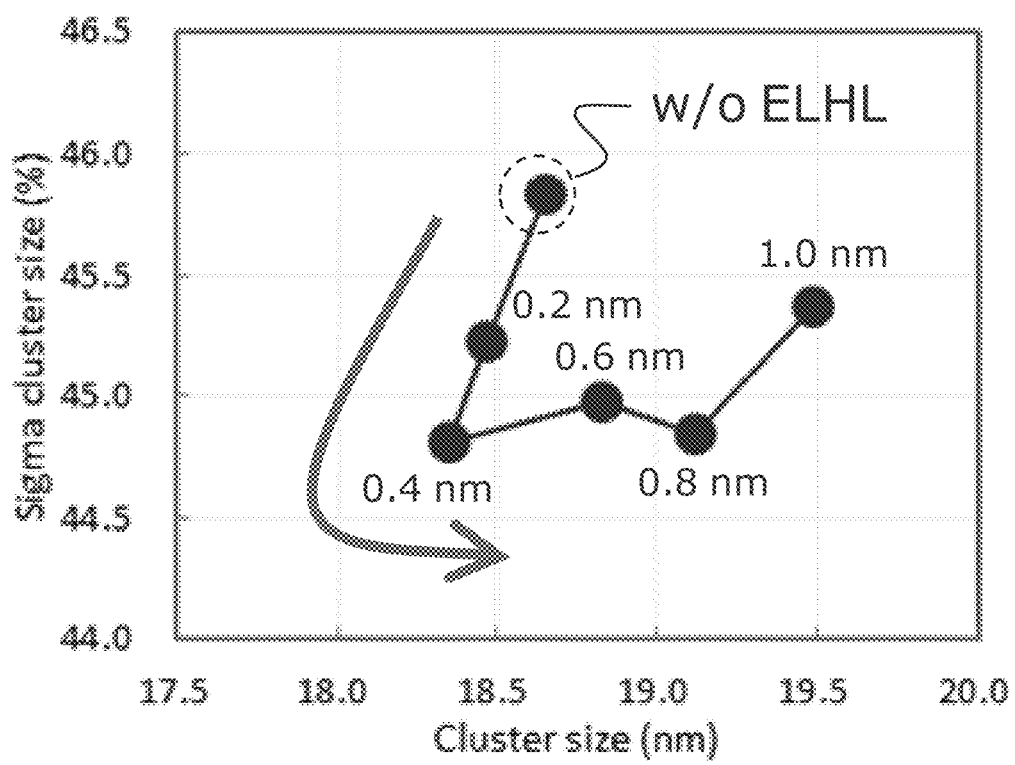
FIG. 9 is another graphical representation of cluster size and cluster size distribution for various thicknesses of an extremely low Hk layer.

FIGS. 8 and 9 graphically illustrate how the presence and thickness of the Extremely Low Hk Layer (ELHL) in the magnetic recording layer effects cluster size and cluster size distribution in a magnetic data recording system. In FIG. 8, line 802 shows how cluster size varies with ELHL thickness, and line 804 shows how cluster size distribution varies with ELHL thickness. Points 806, and 808 show cluster size distribution and cluster size for the case where there is no ELHL at all. In FIG. 8 it can be seen that cluster size decreases as the ELHL thickness increases up to about 0.4 nm. It can also be seen that cluster size distribution decreases with increasing ELHL thickness. This can also be verified with reference to FIG. 9, which plots both cluster size and cluster size distribution for varying ELHL thicknesses. In both graphs it can be seen that optimal results are achieved for when ELHL thickness is about 0.2 to 0.6 nm.

Figure 10:
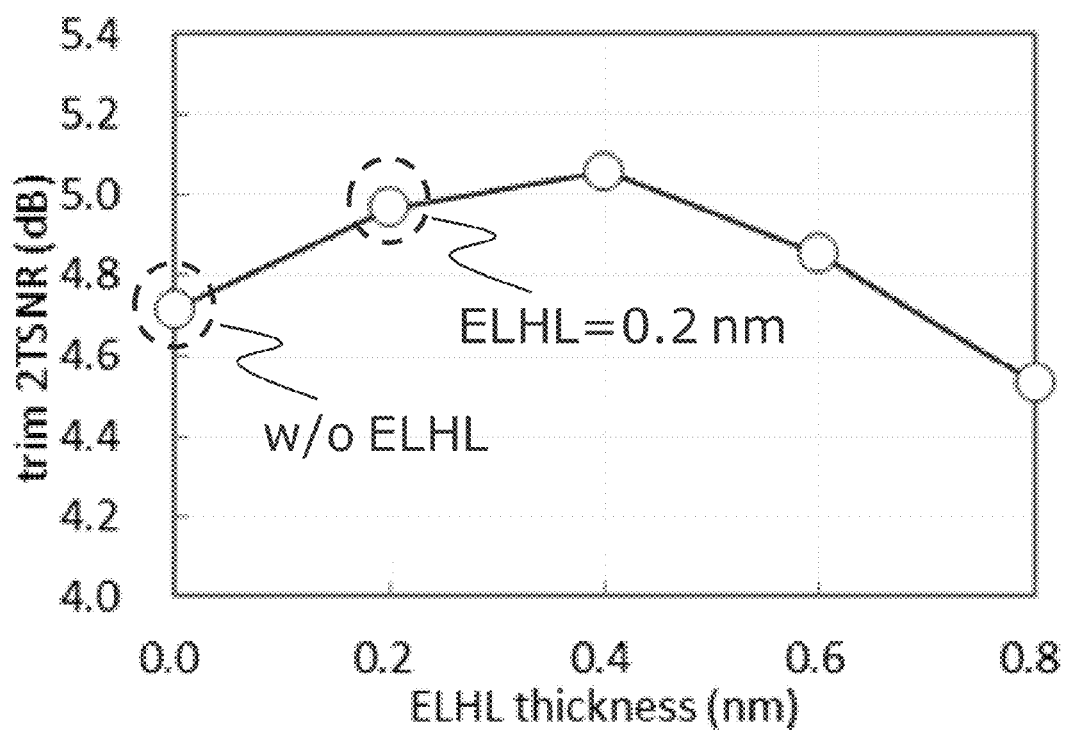
FIG. 10 is a graph showing signal to noise ratio as a function of thickness of an extremely low Hk layer.

FIG. 10 shows how ELHL thickness effects signal to noise ratio which is plotted on the vertical axis. Again, it can be seen that signal to noise ratio increases with increasing ELHL thickness up to about 0.4 nm. Again, optimal results are achieved when ELHL thickness is about 0.2 nm to 0.6 nm.

Figure 11:
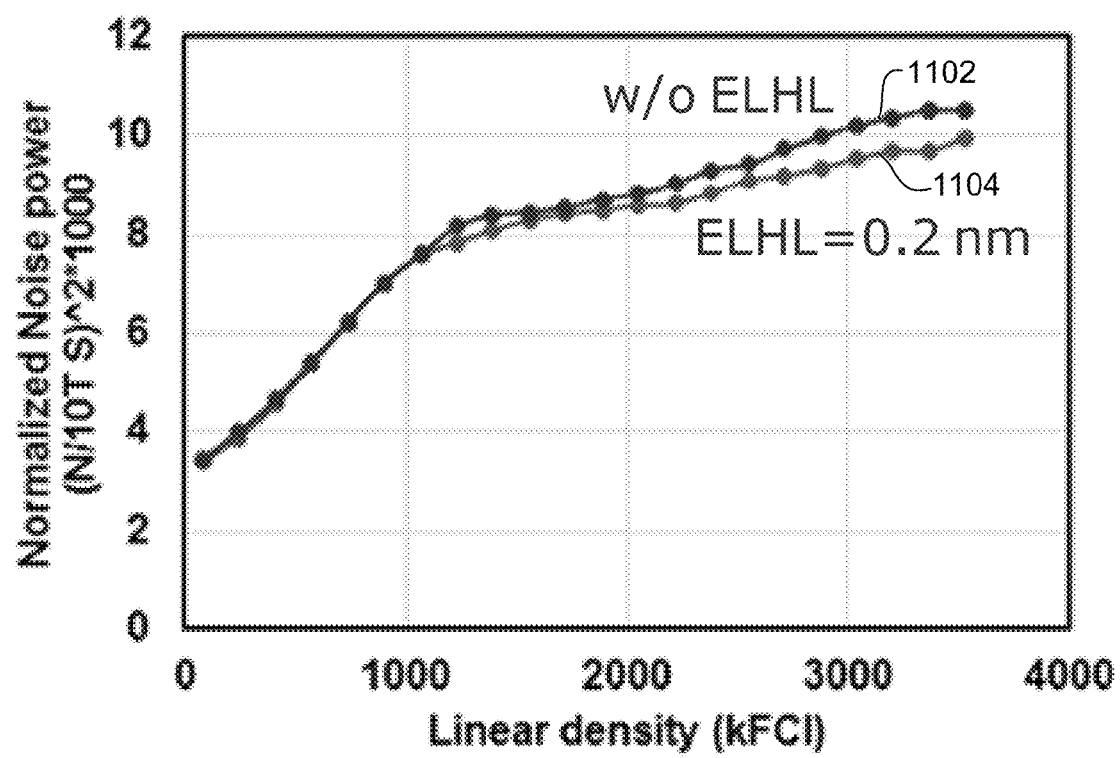
FIG. 11 is a graph showing signal noise as a function of linear density for magnetic media with and without an extremely low Hk layer.

FIG. 11, shows the signal noise profile comparing media with and without an Extremely Low Hk Layer (ELHL). In FIG. 11, line 1102 shows how signal noise increases with increasing linear density for a media having no ELHL at all, and line 1104 shows how signal noise increases with increasing linear density for a system having a media with an ELHL with a thickness of 0.2 nm. As can be seen, the system using the ELHL shows decreased signal noise at higher linear densities. From the above described graphs of FIGS. 8-11, it can be seen that the presence of an Extremely Low Hk Layer (ELHL) in a magnetic recording layer of a magnetic recording media provides significant performance improvement, and that this performance improvement is optimized when the thickness of the ELHL is 0.2-0.6 nm or about 0.4 nm.

While various embodiments have been described above, it should be understood that they have been presented by way of example only and not limitation. Other embodiments falling within the scope of the invention may also become apparent to those skilled in the art. Thus, the breadth and scope of the inventions should not be limited by any of the above-described exemplary embodiments, but should be defined only in accordance with the following claims and their equivalents.

What is claimed is:

1. A magnetic media, comprising:
   a magnetic recording layer comprising a first magnetic portion, a second magnetic portion, and a third magnetic portion,
   wherein the second magnetic portion is between the first magnetic portion and the third magnetic portion;
   wherein the second magnetic portion comprises a first magnetic layer, a second magnetic layer, and a third magnetic layer,
   wherein the third magnetic layer is between and in contact with the first magnetic layer and the second magnetic layer,
   wherein the first magnetic layer and the second magnetic layer are composed of a first magnetic material and the third magnetic layer is composed of a second magnetic material, and
   wherein the second magnetic material has an anisotropy field that is at least 10 kOe lower than the anisotropy field of the first magnetic material.

2. The magnetic media as in claim 1, wherein the first magnetic portion, the second magnetic portion, and the third magnetic portion comprises an oxide, and wherein the magnetic recording layer further comprises a fourth magnetic portion formed over the third magnetic portion, wherein the fourth magnetic portion comprises no oxide.

3. The magnetic media as in claim 1, wherein the third magnetic layer has a saturation magnetization of more than 500 emu/cc.

4. The magnetic media as in claim 1, further comprising:
   a substrate; and
   a soft magnetic under-layer formed over the substrate,
   wherein the magnetic recording layer is formed over the soft magnetic under-layer.

5. The magnetic media as in claim 1, wherein the third magnetic layer has an anisotropy field of less than 5 kOe.

6. The magnetic media as in claim 1, wherein the first magnetic layer and the second magnetic layer each has an anisotropy field of more than 15 kOe.

7. The magnetic media as in claim 1, wherein the third magnetic layer has a thickness of 0.2 to 0.6 nm.

8. The magnetic media as in claim 1, wherein the first magnetic portion is separated from the second magnetic portion by an exchange control layer, and wherein the second magnetic portion is separated from the third magnetic portion by another exchange control layer.

9. The magnetic media as in claim 1, wherein the third magnetic layer has a negative anisotropy field.

10. The magnetic media as in claim 1, wherein the second magnetic material of the second magnetic portion comprises Co and at least one of Cr and Ru.

11. The magnetic media as in claim 1, wherein first and second magnetic materials each comprise Pt and wherein the second magnetic material has at least 10 atomic percent less Pt than the first magnetic material.

12. The magnetic media as in claim 1, wherein the second magnetic material of the second magnetic portion comprises a non-magnetic element in an amount that is less than 20 atomic percent.

13. The magnetic media as in claim 1, wherein the first magnetic portion has an anisotropy field that is above that of the third magnetic portion and the second magnetic portion has an anisotropy field that is between that of the first magnetic portion and the third magnetic portion.

14. The magnetic media as in claim 1, wherein the second magnetic material of the second magnetic portion comprises Pt at a concentration of less than 5 atomic percent.

15. The magnetic media as in claim 14, wherein the first magnetic material of the second magnetic portion comprises Pt at a concentration of more than 15 atomic percent.

16. The magnetic media as in claim 1, wherein the second magnetic material of the second magnetic portion comprises at least one of Ru, W, Fe, Hf, Ta and Nb.

17. The magnetic media as in claim 16, wherein the second magnetic material of the second magnetic layer further comprises Ir.

18. A magnetic recording system, comprising:
   a housing;
   a magnetic media mounted within the housing; and
   a magnetic head configured for movement adjacent to a surface of the magnetic media,
   wherein the magnetic media further comprises:
      a magnetic recording layer comprising a first magnetic portion, a second magnetic portion, and a third magnetic portion,
      wherein the second magnetic portion is between the first magnetic portion and the third magnetic portion,
      wherein the second magnetic portion comprises a first magnetic layer, a second magnetic layer, and a third magnetic layer, wherein the third magnetic layer is between and in contact with the first magnetic layer and the second magnetic layer, wherein the first magnetic layer and the second magnetic layer are composed of a first magnetic material and the third magnetic layer is composed of a second magnetic material, and wherein, the second magnetic material has an anisotropy field that is at least 10 kOe lower than the anisotropy field of the first magnetic material.

19. The magnetic recording system as in claim 18, wherein the third magnetic layer has an anisotropy field of less than 5 kOe.

20. The magnetic recording system as in claim 18, wherein the magnetic head includes a magnetic write pole, a magnetic side shield and a non-magnetic side gap located between the magnetic write pole and the magnetic side shield, wherein the non-magnetic side gap has a thickness of at least 60 nm.

* * * * *